March 12, 1946. K. F. MOLLER 2,396,335
ART OF DRILLING
Filed July 10, 1943
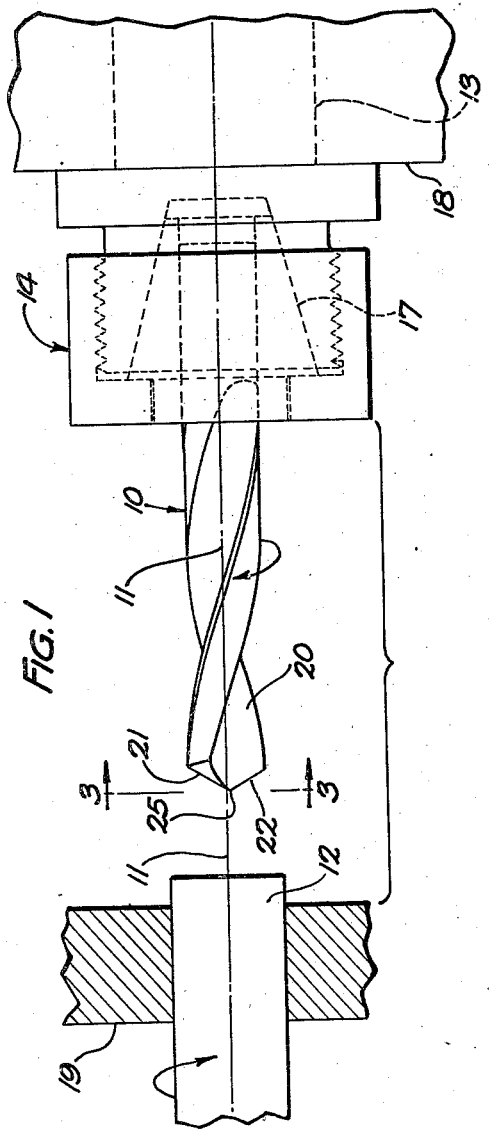
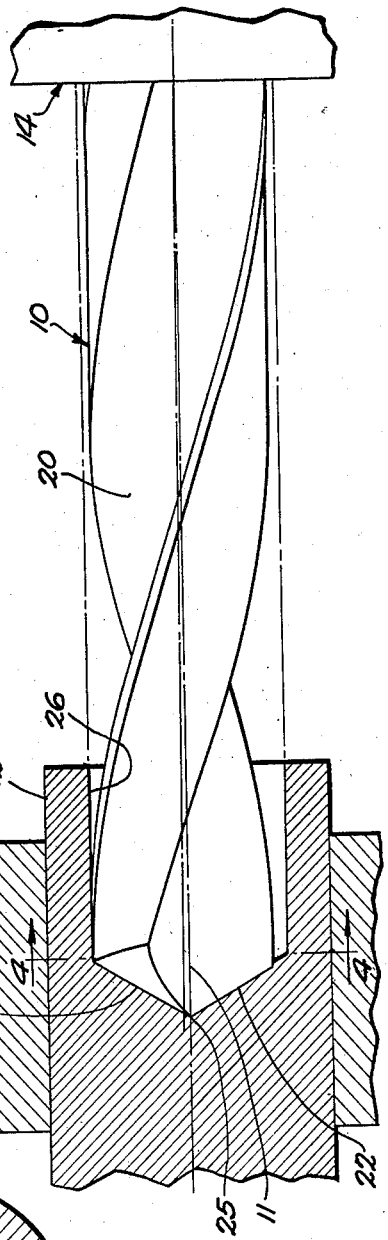
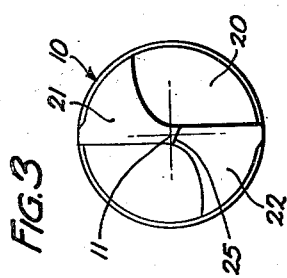
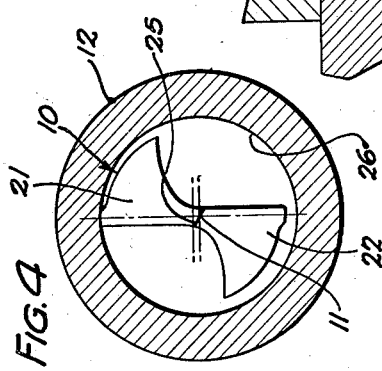
INVENTOR
K. F. MOLLER
BY Harry R. Auft
ATTORNEY Patented Mar. 12, 1946

2,396,335

UNITED STATES PATENT OFFICE 2,396,335

ART OF DRILLING

Kasper F. Moller, Chicago, Ill., assignor to Western Electric Company, Incorporated, New York, N. Y., a corporation of New York Application July 10, 1943, Serial No. 494,157

5 Claims. (Cl. 77—67)

This invention relates to the art of drilling and particularly to drills for use in drilling holes accurately in material having a non-uniform hardness.

Considerable difficulty is encountered in drilling holes accurately; for example, the drilling of holes in rods, concentrically relative to their axes, wherein the rods are composed of material having a non-uniform hardness, such as occurs in highly leaded brass having an uneven segregation of lead producing soft lead areas in the rod. In the drilling of holes in rods of such material by means of a usual type of drill, the soft areas, offering less resistance to the drill, cause the drill to be deflected, thus producing non-rectilinear off-center or eccentric holes relative to the axis of the rod.

An object of the present invention is to provide a simple and practicable drill structure and an arrangement for supporting the work and drill capable of overcoming the above-mentioned difficulties encountered in drilling holes accurately in material having a non-uniform hardness.

In accordance with the above object, one embodiment of the invention comprises a spiral grooved drill body terminating at its working end in bevelled cutting edges or lips of uneven length with the juncture line thereof located eccentrically relative to the axis of the drill body. Further, the grooved working portion of the drill has a definite length relative to its diameter and the diameter is predeterminedly smaller than the hole to be drilled. In operating a drill so formed and suitably supported close to a rigidly supported and accurately aligned work piece composed of material of non-uniform hardness, a predetermined lateral pressure is set up due to the uneven lengths of the cutting edges or lips. This pressure counteracts the tendency of the drill to be deflected by soft areas in the work piece and the eccentric juncture line of the cutting edges is caused to rotate in the axis of rotation of the drill body. Thus, a hole is drilled concentric with the axis of rotation of the drill.

Other objects and advantages of the invention will more fully appear from the following detailed description taken in conjunction with the accompanying drawing, in which Fig. 1 is a fragmentary diagrammatic general view of a drill and its support embodying the features of the invention shown rotatably mounted and supported in position in axial alignment with a rotatably supported work piece to be drilled;

Fig. 2 is a greatly enlarged view of the drill entered in the work and showing the position of its cutting end and the eccentric juncture line of the cutting edges thereof in the operation of drilling;

Fig. 3 is a greatly enlarged end view of the drill taken on the line 3—3 of Fig. 1; and Fig. 4 is a vertical irregular section taken on the line 4—4 of Fig. 2.

Referring particularly to Fig. 1 of the drawing, a drill embodying the features of the invention is indicated in general at 10, which, in the particular application thereof, is shown with its longitudinal axis indicated by broken line at 11, arranged coaxial with the longitudinal axis of a work piece in the form of a rod 12 composed of highly leaded brass in which an uneven segregation of lead generally occurs.

The drill 10 is suitably connected to a driving spindle 13 shown fragmentarily, which receives motion from a driving source (not shown) by a usual type chuck indicated in general at 14, employing a split tapered bushing 17. A bearing 18 of suitable rigidity supports the rotatable spindle relatively close to the rod 12 to be drilled, which may be driven by suitable means (not shown), the bearing being such that it is effective to resist a predetermined lateral pressure, for example, a 25-pound pressure produced in the drilling operation at the cutting point of the drill 10, without deflection of the bearing when using a one-quarter inch drill having a free outer end working portion of a length approximately five times the diameter thereof. The rod 12 to be drilled is also suitably supported by a bearing 19 effective to resist lateral pressure, as described in connection with the spindle bearing 18.

As illustrated in Figs. 1 and 3, the drill 10 is shown disengaged from the rod 12 to be drilled and in the present embodiment thereof is spirally grooved, as indicated at 20, and is suitably slightly smaller in diameter than the hole to be drilled, the reason for which will be brought out hereinafter. At its cutting end, the drill 10 terminates in two bevelled cutting edges or lips 21 and 22, the lip 22 being shorter than the lip 21, thus producing a line of juncture 25 of the cutting edges disposed eccentric relative to the longitudinal axis 11, previously referred to, of the drill and the rod 12. For purposes of illustration, the eccentricity of the juncture line 25 has been magnified and is shown clearly in Fig. 3.

It will be understood that the purpose of the drill 10 embodying the described features and of the means of supporting it and the rod 12 in the manner set forth above is to eliminate the drilling of non-rectilinear off-center or eccentric holes in material having a non-uniform hardness such as, for example, in the highly leaded brass rod 12, wherein it is necessary to drill a rectilinear hole coincident with its axis 11. In drilling such rods 12 of highly leaded brass wherein an uneven segregation of the lead results in soft lead areas by means of an ordinary drill supported together with the work in the usual manner, a deflection of the cutting end of the drill results due to the soft lead areas, offering less resistance to the drill and thus a non-rectilinear hole is formed eccentric to the longitudinal axis 11 of the rod.

Referring now particularly to Figs. 2 and 4, in which the longitudinally advancing and rotating drill 10 is shown in operation drilling a hole 26 in the rod 12, it is assumed that the drill and rod are being rotated in opposite directions, as indicated by the arrows (Fig. 1), at desired speeds and means (not shown) is advancing the bearing 18, spindle 13 and drill bodily, as the drilling progresses at a suitable rate of speed.

Initially, the eccentric juncture line 25 of the cutting edges 21 and 22 of the drill engages the end face of the rod laterally of its axis 11, but it is immediately deflected toward and into coaxial alignment therewith, as shown in Figs. 2 and 4, due to the uneven lengths of the cutting edges or lips 21 and 22, which act in a cam-like manner caused by the pressure of the drill on the rod as the drill is longitudinally advanced, thus flexing the outer end working portion of the drill 10 about a fulcrum provided by the axis of the rigidly held spindle 13 and bearing 18, which are effective to resist, for example, a lateral pressure of 25 pounds. After the juncture line 25 of the cutting edges 21 and 22 is in coaxial alignment with the axis 11 of the drill 10 at its inner rigidly supported end and that of the accurately aligned rod 12, which is also rigidly supported, it remains there in spite of soft lead areas in the rod and the hole 26 is drilled to its full depth in the rod without deviation from the axis 11 of the rod.

Although the drill 10 and the rod 12 are described above as rotating in opposite directions and that the drill is longitudinally advanced to the rod, it will be understood that this is not essential. In some cases, it may be desirable to advance the rod 12 to the drill and in another case to advance both the rod and the drill towards each other and also to solely rotate either the drill or the rod.

It will be understood that the embodiment herein described is merely illustrative of the invention and one application thereof and that modifications can be made and it is capable of other applications.

What is claimed is:

1. A drill for drilling rectilinear holes in material of non-uniform hardness comprising a drill body having bevelled cutting edges of uneven length producing an off-center cutting edge juncture and the drill body being of such length as to be effective during operation to deflect the drill cutting end laterally and cause said juncture to rotate in the axis of rotation of said drill body and thus produce a rectilinear hole.

2. A drill for drilling rectilinear holes in material of non-uniform hardness comprising a drill body having bevelled cutting edges of uneven length producing an off-center cutting line at its cutting end, and means for supporting said drill body on its axis of rotation, said drill body being of such length as to be effective for resisting a predetermined lateral pressure whereby during operation of the drill said cutting line will be deflected laterally and rotate in the axis of rotation of said drill body and thus produce a rectilinear hole.

3. A drill for drilling rectilinear holes in material of non-uniform hardness comprising a drill body having a diameter slightly smaller than the hole to be drilled, bevelled cutting edges of uneven length producing an off-center cutting edge juncture, said drill body being of such length as to be effective during operation to deflect the drill cutting end laterally and cause said juncture to rotate in the axis of rotation of the drill and thus produce a rectilinear hole.

4. A drill for drilling rectilinear holes in material of non-uniform hardness comprising a drill body having a diameter slightly smaller than the hole to be drilled, a working portion of a predetermined length relative to its diameter, bevelled cutting edges of uneven length producing an off-center cutting edge juncture line, and means for supporting said drill body on its axis of rotation effective for resisting a predetermined lateral pressure whereby said cutting edge juncture is effective during operation to deflect the drill cutting end laterally and cause said juncture to rotate in the axis of rotation of the drill and thus produce a rectilinear hole.

5. A drill for drilling rectilinear holes in rods composed of material of non-uniform hardness comprising a drill body having bevelled cutting edges of uneven length producing an off-center cutting line at its cutting end, and means for supporting said drill body for rotation and the rod to be drilled co-axially for resisting a predetermined lateral pressure whereby said cutting line is caused to move radially of the drill body and rotate in the axis of rotation of said drill body and thus produce a rectilinear hole.

KASPER F. MOLLER.